July 2, 1940.  R. WESTENBERGER ET AL  2,206,492
SPLINE SHAFT GRINDING MACHINE
Filed May 2, 1939  7 Sheets-Sheet 1

Inventors:
Rudolf Westenberger
Walter Hauffe
Willy Georgi
by Karl Viertel
Attorney.

Inventors: Rudolf Westenberger
Walter Hauffe
Willy Georgi
by Karl Viertel
Attorney July 2, 1940. R. WESTENBERGER ET AL 2,206,492
SPLINE SHAFT GRINDING MACHINE
Filed May 2, 1939    7 Sheets-Sheet 3
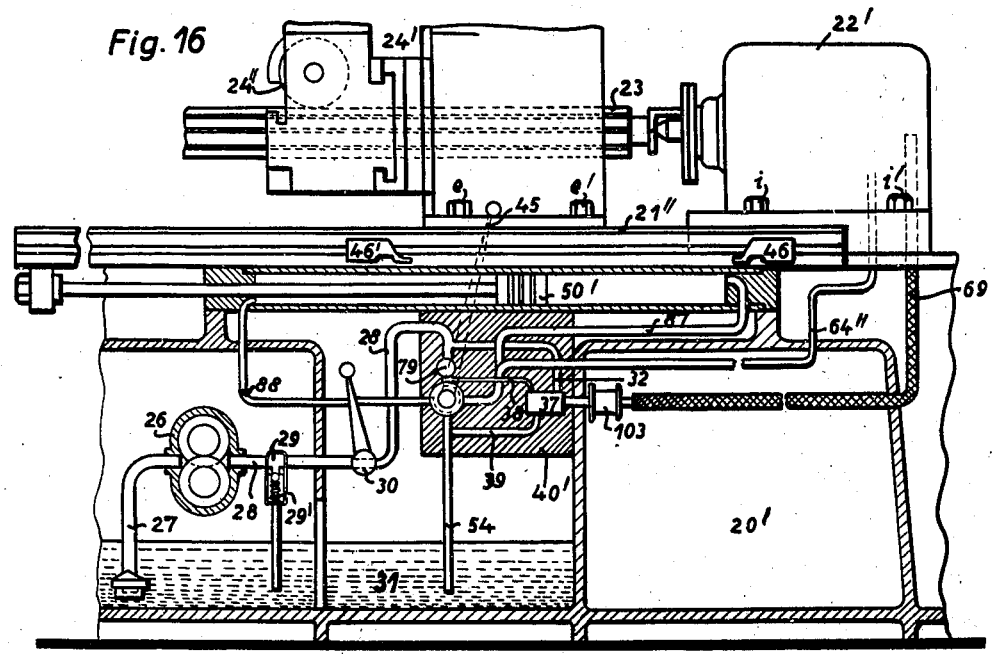
Fig. 16
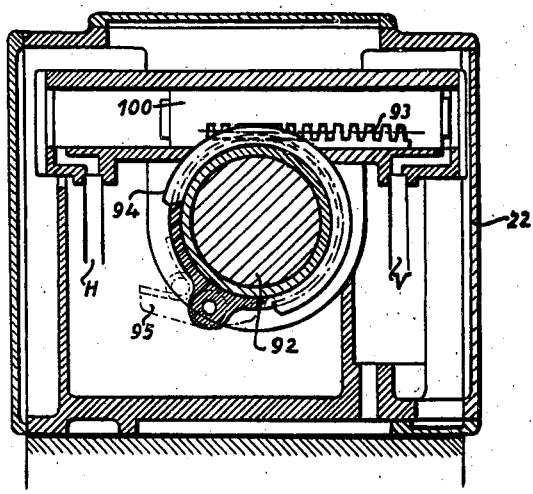
Fig. 3ª
Inventors: Rudolf Westenberger
Walter Hauffe
Willy Georgi
by Karl Viertel
Attorney.

July 2, 1940. R. WESTENBERGER ET AL 2,206,492
SPLINE SHAFT GRINDING MACHINE
Filed May 2, 1939 7 Sheets-Sheet 4

Inventors:
Rudolf Westenberger
Walter Hauffe
Willy Georgi
by Karl Viertel
Attorney.

July 2, 1940.  R. WESTENBERGER ET AL  2,206,492
SPLINE SHAFT GRINDING MACHINE
Filed May 2, 1939   7 Sheets-Sheet 5
Fig. 5ᵃ
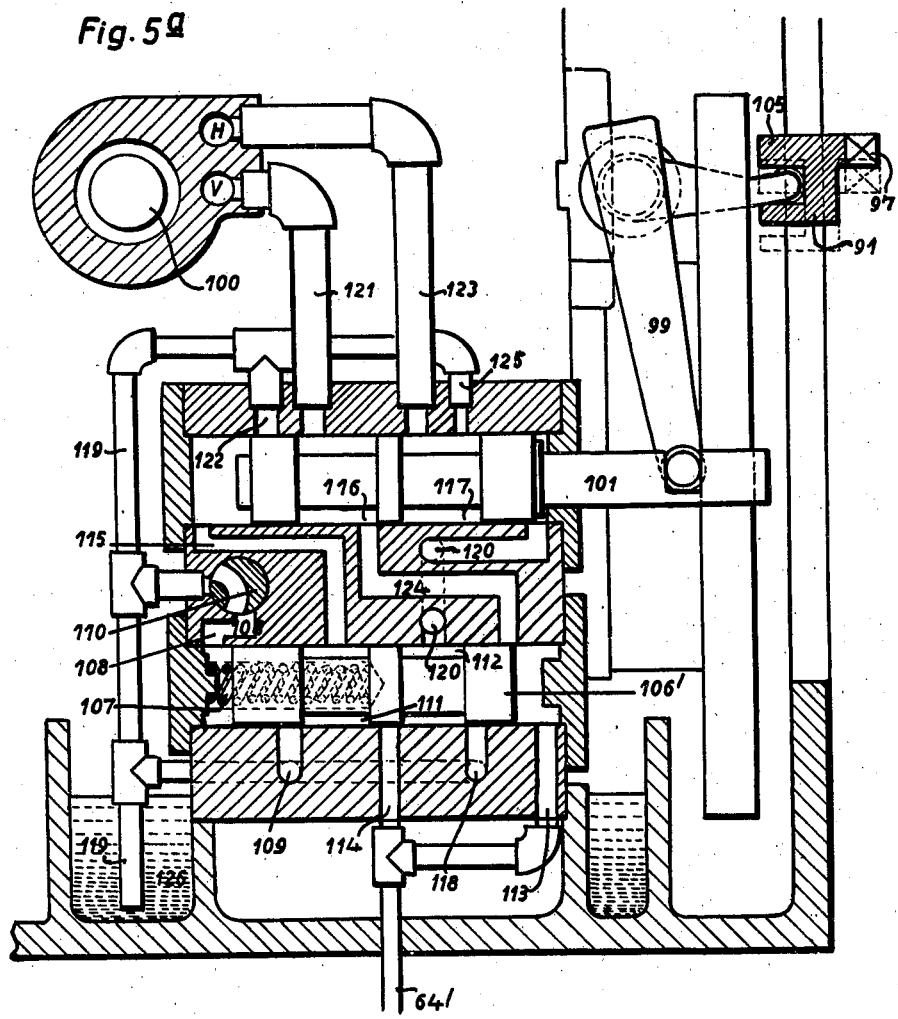
Inventors:
Rudolf Westenberger
Walter Hauffe
Willy Georgi
by Karl Viertel
Attorney.

July 2, 1940.  R. WESTENBERGER ET AL  2,206,492
SPLINE SHAFT GRINDING MACHINE
Filed May 2, 1939  7 Sheets-Sheet 6

Inventors:
Rudolf Westenberger
Walter Hauffe
Willy Georgi
by Karl Viertel
Attorney July 2, 1940.  R. WESTENBERGER ET AL  2,206,492
SPLINE SHAFT GRINDING MACHINE
Filed May 2, 1939 7 Sheets-Sheet 7
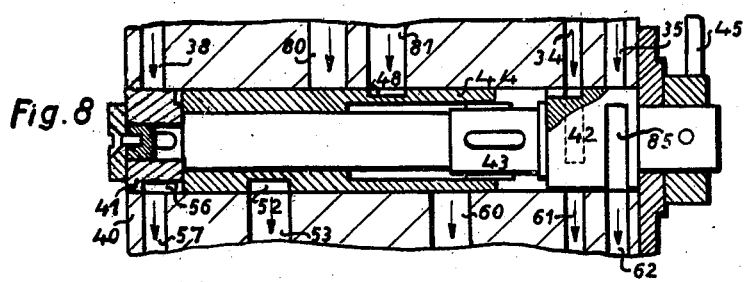
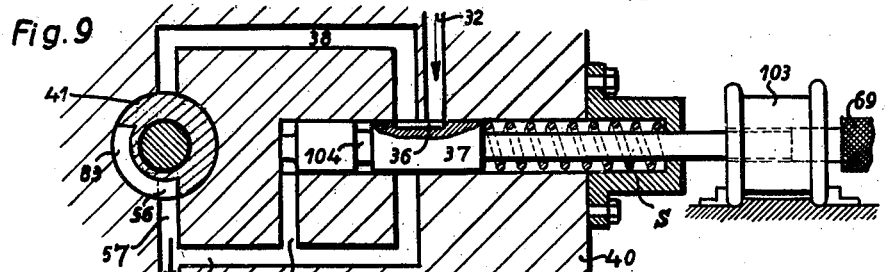
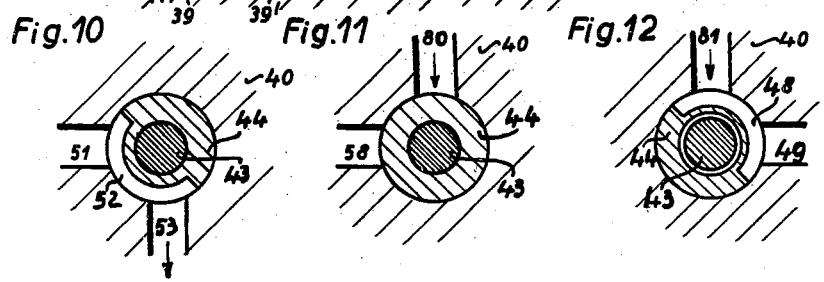
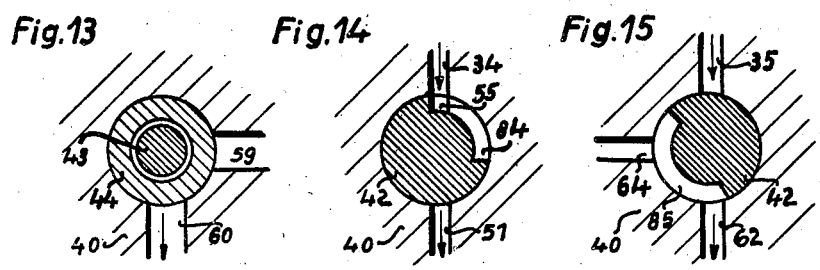
Inventors:
Rudolf Westenberger
Walter Hauffe
Willy Georgi
by Karl Viertel
Attorney Patented July 2, 1940

2,206,492

UNITED STATES PATENT OFFICE 2,206,492

SPLINE SHAFT GRINDING MACHINE

Rudolf Westenberger, Walter Hauffe, and Willy Georgi, Chemnitz, Germany, assignors to J. E. Reinecker, Aktien-Gesellschaft, Chemnitz, Germany Application May 2, 1939, Serial No. 271,302
In Germany November 30, 1932

4 Claims. (Cl. 51—92)

Our invention relates to automatic machine tools for grinding splined shafts, cutting the teeth of gear wheels, and the like, and producing in general circumferentially profiled pieces of work, of which the blanks in the course of the machining operations are axially reciprocated relatively to the tool, and are step by step angularly indexed relatively to the tool.

The invention relates more especially to improvements in automatic machine tools of the type and for the purposes set forth hereinafter briefly called spline shaft grinding machines, in which the said reciprocating and indexing movements are both performed by hydraulically operated mechanisms.

Spline shaft grinding machines having hydraulically operated mechanisms for performing the reciprocating and indexing movements concerned are nowadays preferred in many cases, because their hydraulic mechanisms are capable of being more easily controlled by the operator, namely, readjusted in a continuous and highly exact manner as to their working speed, for instance as to the feeding of the blank relatively to the grinding wheel, by means of simple throttle valves, in contradistinction to machine tools, in which the working speed of mechanically driven mechanisms can be adjusted only intermittently and by degrees or steps.

On the other hand the hydraulically operated mechanisms of spline shaft grinding machines are subject to leakage resulting in inaccurate indexing and even in damage to the tool or blank causing long interruptions in the working of the machine.

The principal object of this invention is to provide an improved hydraulically operated spline shaft grinding machine of the type concerned, in which the mechanism for reciprocating the blank relatively to the tool is cooperatively associated with and functionally subordinated to the indexing mechanism in such manner, that the reciprocating mechanism is not unlocked and set free for starting upon a fresh working stroke until the indexing mechanism has been properly re-set and locked in its fresh working position.

In other words the invention aims at avoiding damaging the workpiece of the machine tool or both in the event of the hydraulically actuated indexing mechanism not operating accurately on account of leakage in the conduits, namely at positively preventing the table to start upon a fresh working stroke as long as the indexing mechanism remains in a wrong position.

Another object of the invention is, to relieve the control elements and to reduce the wear of the delicate parts of the indexing mechanism for the purpose of facilitating their smooth operation and ensuring gentle and highly accurate indexing operations.

Furthermore the invention aims at reducing the number of the component parts of the indexing mechanism, especially the number of liquid conduits, so as to reduce the sources of defects.

Finally, the invention aims at providing improved means for regulating the speed in the indexing operations—including turning of the index plate, and engagement of the pawl—so as to afford coarse indexing to be performed as quickly as fine indexing.

Other objects of the invention will become apparent to practitioners in this field as the description proceeds.

The nature and scope of the invention are briefly outlined in the appended claims and will be more fully understood from the following specification taken together with the accompanying drawings, in which spline shaft grinding machines re-designed according to this invention are shown by way of examples:

Fig. 1 is a fragmentary front elevation showing the re-designed machine with its most important parts, Figs. 2 and 2a are electric wiring diagrams showing the main pawl of the indexing mechanism in different positions, Fig. 3 shows the indexing mechanism on a larger scale and in section vertically taken through its main axis, Fig. 3a is a cross-section of the indexing mechanism taken on line IIIa—IIIa of Fig. 3, Fig. 4 is a front elevation of the indexing mechanism with casing cover removed, Figs. 5 and 5a show in section taken on line V—V of Fig. 4 a time-relay provided in the indexing mechanism and its hydraulic motors for the index pawl and for the index plate in different operating positions, Fig. 6 is a section vertically taken through the table and indexing control mechanism on line VI—VI of Fig. 1;

Fig. 8 shows some parts of the control member shown in Fig. 6 in section;

Fig. 9 is a cross section vertically taken through the principal control member on line IX—IX of Fig. 6 and showing also an electromagnetically operated shut off valve associated therewith;

Figs. 10 to 15 are cross sections through the principal control member taken on lines X—X to XV—XV of Fig. 6;

Fig. 16 is a diagrammatic general view of a machine modified structurally, wherein the reciprocating table carries the grinding wheel, whereas the indexing mechanism and the workpiece are stationary.

Figure 2:
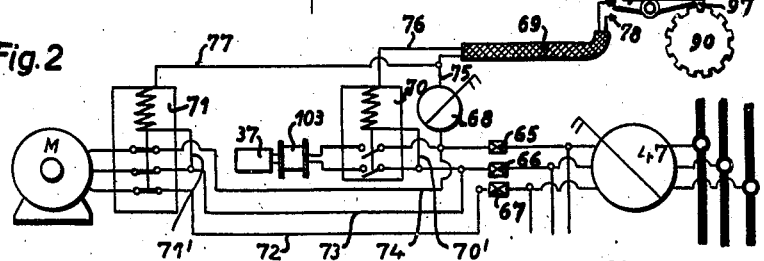
Figure 2A:
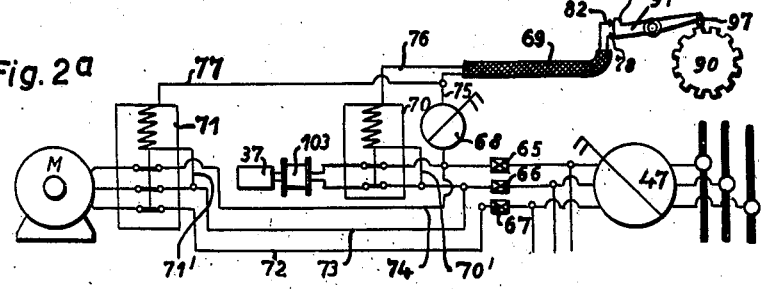

The spline shaft grinding machine re-designed with the objects in view outlined above comprises:

A table 21, reciprocable in the direction of arrows 25, which is slidably mounted on the machine bed 20 under a grinding wheel 24; the table 21 carries a workpiece headstock structurally associated with an indexing mechanism 22 and the workpiece 23 which is rotated by means of a catch 23'. The table 21 and the indexing mechanism 22 are both operated by hydraulic pressure produced by an oil pump 26 driven by a prime mover M (Figs. 2, 2a); the oil is sucked from storage tank 31 through conduit 27 and forced into a conduit 28 provided with a pressure relief valve 29 loaded by a spring 29'; by means of a check valve 30 operable by hand the oil under pressure can be turned on and off, while the oil pump 26 is running. The oil conduit 28 divides into several branches within a control block 40, allowing the oil to pass from the conduit 28 through a throttle valve 79 (Fig. 6) operable by hand into two passages 80 and 81, and, before reaching the throttle valve 79, into conduits 32 and 33, of which the conduit 32 leads to a shut-off valve 37 (Fig. 9) loaded by a spring S, whereas the conduit 33 divides up into two additional passages 34 and 35 which both lead to a cock plug 42.

The shut-off valve 37 (Figs. 1, 9) has a longitudinal channel 36 and an annular recess 104 and is connected to an electromagnet 103; conduit 38 leads from valve 37 to a cock plug 41, and another conduit 39 leads to a discharge channel 57; 39' is a pressure relief channel provided in control block 40 and leading from conduit 39 to the front end of the shut-off valve 37.

Figure 6:
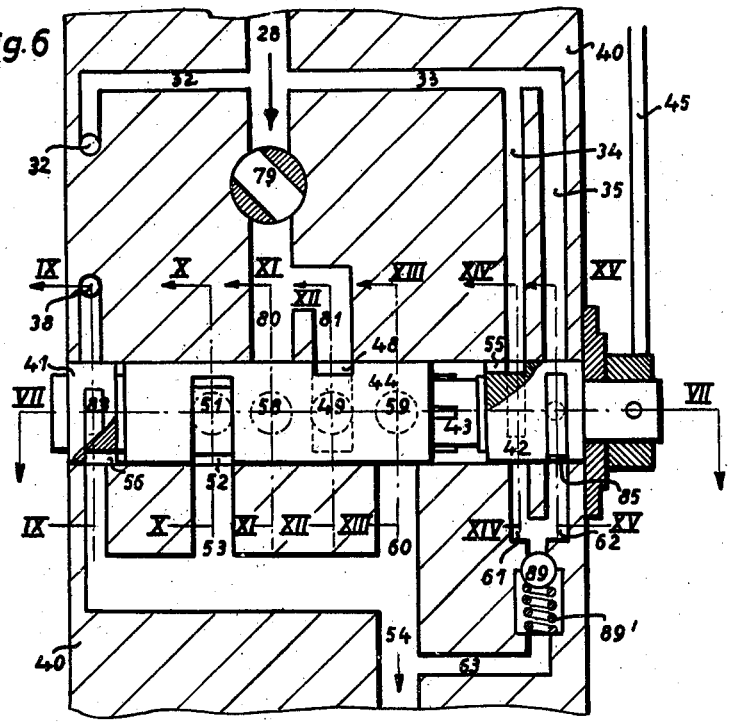
Figure 7:
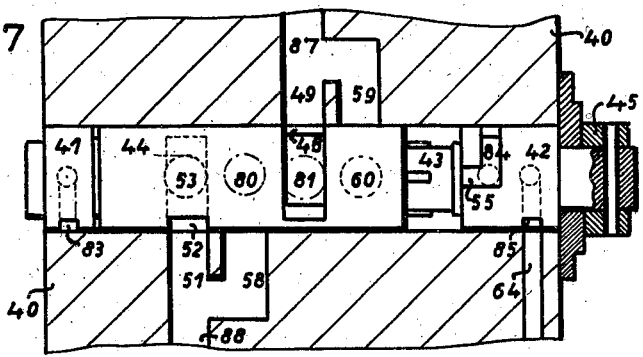
Fig. 7 is a section horizontally taken through the principal oscillatable control member on line VII—VII of Fig. 6.

Both cock plugs 41 and 42 (Figs. 6, 7 and 8 are arranged coaxially in a bore hole of the control block 40; they are rigidly interconnected by a spline shaft 43; a sleeve 44 is slidably arranged on said spline shaft 43 between said cock plugs and participates in their rotary motion. The cock plug 41 has a circumferential groove 83 (Fig. 9) and a longitudinal groove 56 (Figs. 6 and 8), which is open at the end adjacent the sleeve 44 (Fig. 8); cock plug 42 has two peripheral passages 84 and 85 (Figs. 7, 14, 15) and a longitudinal passage 55, whereas the sleeve 44 has two peripheral recesses 48 and 52.

Figure 1:
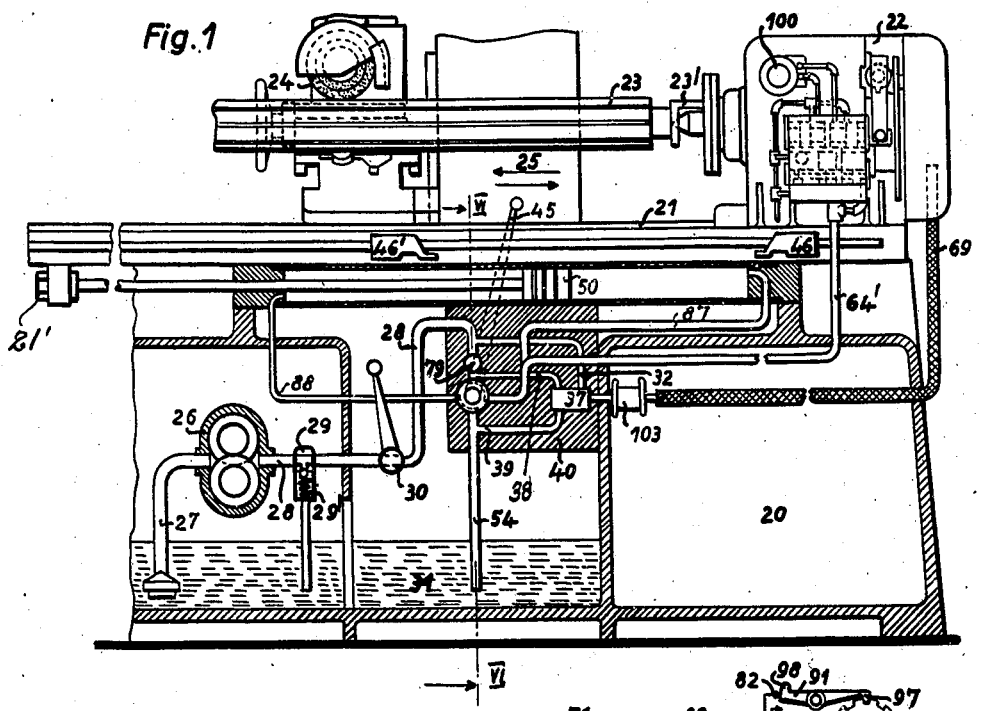

The cock plugs 41 and 42 are turned around jointly with the sleeve 44 by means of an adjustable dog or abutment 46 (Fig. 1) fixed on the table 21 and acting on a lever 45 indicated in dash lines in Fig. 1. Other passages 57, 53, 60, 61 and 62 (Fig. 6) in the control block 40 are connected with a discharge passage 54, a spring loaded pressure ball valve 89 being arranged in the discharge of the passages 61, 62 which unite to form a passage 63; the spring 89' of the ball valve 89 is weaker than the spring 29' of the pressure relief valve 29 (Fig. 1).

In addition to the above mentioned passages, the control block 40 has passages 49, 59 (Fig. 7) which unite to form a passage 87 leading to the right side of the piston 50 operating the table 21 (Fig. 1), which is rigidly connected therewith at 21'—passages 57, 58 (Fig. 7) which unite to form a passage 88 leading to the left side of the working piston 50—and a passage 64 (Fig. 7) connected to the indexing mechanism by means of a pipe 64' (Fig. 1).

The indexing mechanism

Figure 3:
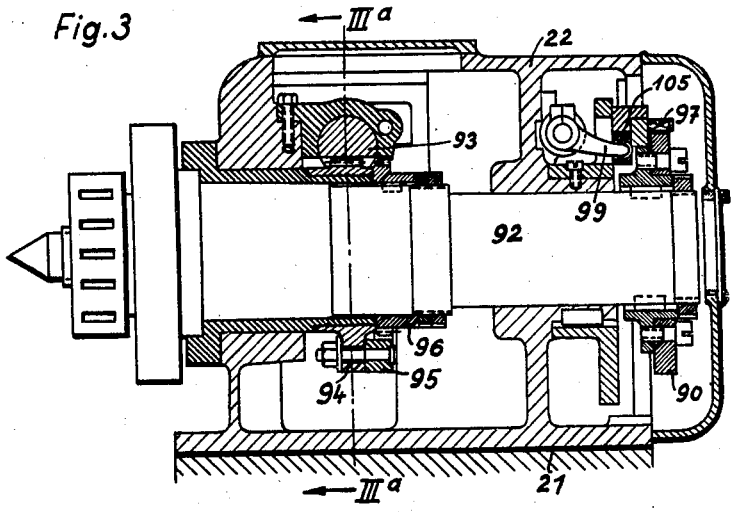

The indexing mechanism 22 comprises an index plate 90 (Figs. 3 and 4) which is exchangeably mounted on the workpiece spindle 92 and in which an oscillatably mounted index pawl 91 engages. Keyed on the workpiece spindle 92 is a ratchet wheel 96 in which a pawl 95 engages which is mounted on a toothed wheel 94 and kept constantly in contact with the ratchet wheel 96 by a spring not shown on the drawings.

Figure 4:
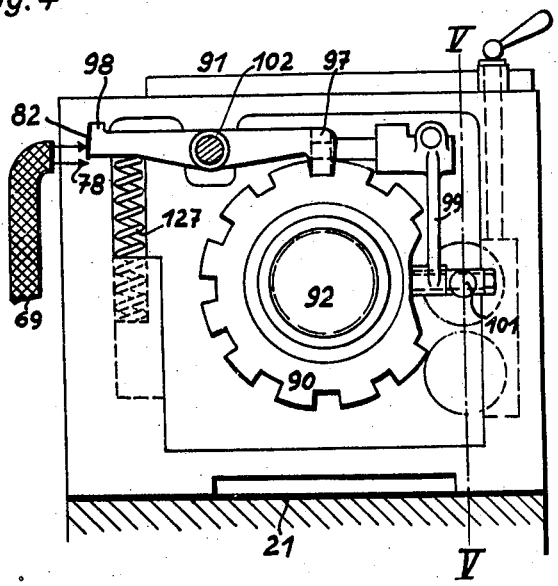
Figure 5:
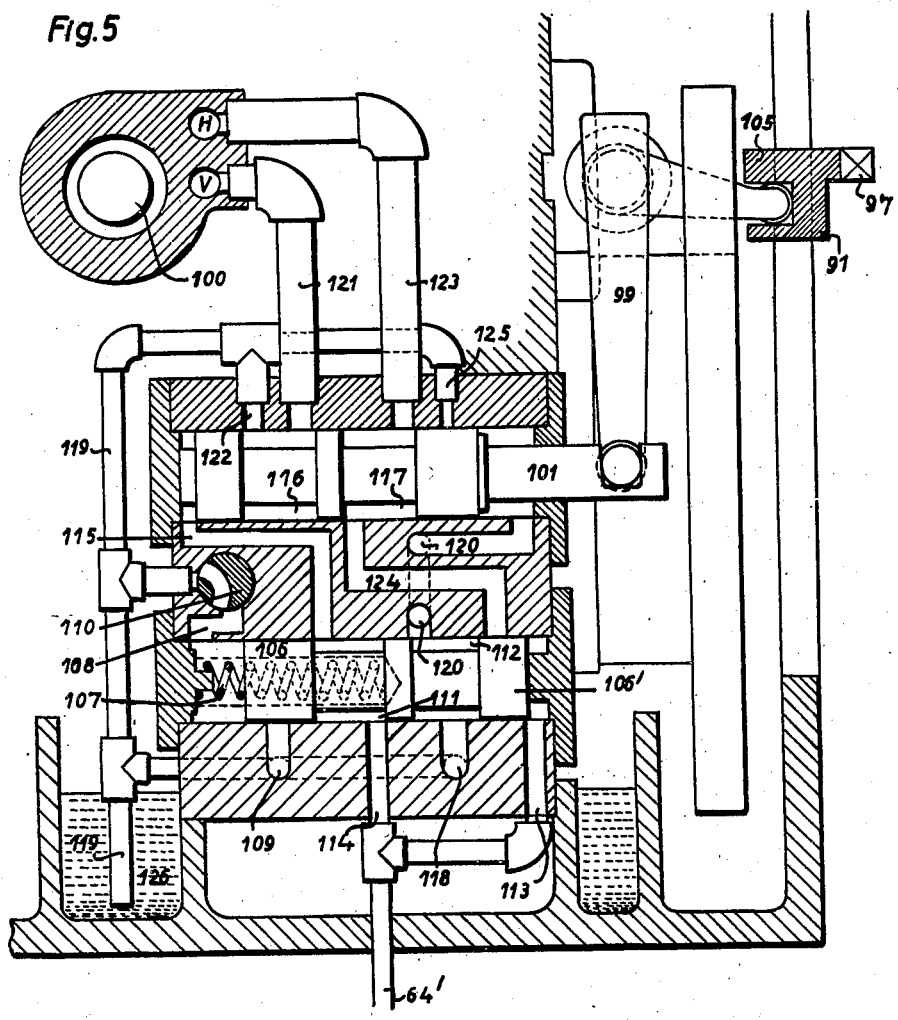

A rack 93 (Fig. 3a) movable perpendicular to the plane of the drawings meshes with the toothed wheel 94 and is arranged on and coaxial to the piston of a hydraulic motor 100 (Figs. 3a and 5). The index pawl 91 (Fig. 4) is a two-armed lever which is mounted on a bolt 102 (Fig. 4) and has on the end of one arm a nose 97 engaging the notches in the index plate and on the end of the other arm a contact plate 98 which is pressed constantly against a contact 82 of a two-wire electric cable 69 for the electric magnet 103 (Fig. 9). The cable 69 has a second contact 78 (Fig. 2) which, when the index pawl 91 is disengaged, is connected to the contact 82 by the contact plate 98. The nose 97 of the index pawl 91 is continually pressed strongly against the index plate 90 by a spring 127 (Fig. 4).

The time-relay

Index pawl 91 is operated by a hydraulic motor, the piston 101 of which (Figs. 4, 5) has annular passages 116 and 117 and is connected to an extension of the pawl 91 by means of a bell crank lever 99; the movements of the piston 101 are controlled by a hydraulic time-relay designed as a plunger 106, 106', having annular passages 111 and 112 and being loaded by a spring 107; said plunger is operated by hydraulic pressure the supply of which is adjustable by means of a manually controlled throttle valve 110.

Passages 113 and 114 are formed in the indexing mechanism which are connected to the conduit 64' referred to above (Figs. 1 and 5).

The time-relay plunger 106, 106' and the piston 101 for operating the index pawl 91 are cooperatively interconnected by passages 115, 120 and 124; the piston 101 is in turn connected by conduits 121 and 123 to the piston 100 for actuating the index plate 90. The conduit 121 and its extension V lead to the front side (Figs. 3a and 5) of the piston 100 operating the index plate 90, while the passage 123 and its continuation H lead to the rear side of said piston 100.

Other passages 108, 109, 118, 122, 125 are connected to an overflow conduit 119 which leads to an oil collecting tank 126.

The electric equipment

The electric equipment comprises (1) a main switch 47 (Fig. 2) which controls the whole of the electric drive of the machine, switches 65, 66, 67, which are the same for the electromagnet 103 and a motor M for the pressure oil pump 26; (2) a switch 68 in a line 75 which branches into a wire 77 and one wire of the cable 69; the wire 77 leads to an electromagnetic switch 71 the circuit of which being closed by a wire 73; the other wire of 76 the cable 69 leads to an electromagnetic switch 70, the circuit of which is closed by a wire 70' and (3) electric connecting wires 71', 72 and 74.

The table control

The pump 26 sucks oil from the tank 31 and forces it through the conduit 28 (Fig. 1). The pressure oil flows through the throttle valve 79, adjustable by hand for the purpose of effecting stepless regulation of the speed of the table, through conduit 81 (Fig. 6), passage 48, passages 49 and 87 (Figs. 7 and 12) on the right side of the working piston 50 (Fig. 1), and forces the latter towards the left. The oil on the left side of the piston 50 flows back to the collecting tank through the conduits 88, 51 (Figs. 1, 6, 7, 10), the peripheral passage 52 of the sleeve 44 and the conduits 53 and 54. Pressure oil also passes from the conduit 28 through the passages 33, 34, 55 to the right side of the sleeve 44, the left side of which is connected to the discharge passage 54 by the passages 56, 57, so that the sleeve 44 is maintained in its extreme left position by the liquid pressure. As the conduit 64' leading to the indexing mechanism 22 is under a slight pressure determined by the ball valve 89, and as cock plug 42, being in the position shown in Figs. 6 and 15, connects the conduit 64 and the discharge conduit 62 through the passage 82, the time-relay 106 loaded by the spring 107 and pressed by the latter to the right will assume the position shown in Fig. 5.

Operation of the machine

When the table 21 moves to the left, and as soon as the abutment 46 (Fig. 1) comes into contact with the lever 45, the cock plugs 41 and 42 and sleeve 44 are turned around in clockwise direction (Figs. 9 to 15), the control edges of which are so arranged relatively to the conduits and passages cooperatively associated therewith that the following control operations are performed successively.

(1) The communication of the passages 56, 83 with the discharge conduit 57 is interrupted in the plug 41 (Fig. 9), at the same time the communication of the passages 55, 84 (Fig. 14) with the pressure oil conduit 34, and of the passages 64, 85 (Fig. 15) with the discharge conduit 64 is blocked in the cock plug 42. In the meantime the table 21 continues to travel and to turn around said plugs and sleeve, namely with unreduced speed, since the sleeve 44 (Figs. 10 and 12) turns idly up to this point and the control edges of the passages 52 and 48 have not yet reached the passages 53 and 81 respectively.

(2) As soon as the passage 62 (Fig. 15) is completely shut off the passage 85, the communication between the passages 35 and 85 is established as the plugs continue to turn in clockwise direction, so that the conduit 64 and consequently the indexing mechanism 22 receives pressure oil. At the same time the sleeve 44 (Fig. 10) commences to throttle the discharge of oil from the left side of the working piston 50 to the passage 53 through the passage 52, and also the pressure oil feed from the passage 81 (Fig. 12) through the passage 48, so that the movement of the table is slowed down which gradually locks itself automatically.

(3) The pressure oil reaching the indexing mechanism through the conduit 64' passes into the conduits 113 and 114 (Fig. 5) and flows from conduit 114 through the annular space 111 and the passage 115 to the left side of the piston 101 operating the index pawl 91 and shifts the latter to the right, since the right side of the piston 101 is in communication through conduit 120, the annular space 112 of the time-relay 106, 106' and passage 118 with the overflow 119 and the collecting tank 126. At the same time the pressure oil flowing through the passage 113 to the right side of the time-relay 106, 106' forces the latter to the left against the pressure of the spring 107; this is accomplished, because the left side of the time-relay plunger is also in communication with the overflow passage 119 and the collecting tank 126 through passage 108 and throttle valve 110 cooperating with the time-relay; said throttle valve is so adjusted that the piston 101 operating the index pawl 91 has completed its travel on reaching its extreme right position, namely before the communication of the passage 118 with passage 120 and of the passages 114, 115—established by the annular spaces 111 and 112 of the time-relay, is interrupted, and before the passage 124 is set free by the time-relay.

In the course of the displacement of the piston 101 operating the index pawl 91 towards the right the latter is disengaged against the action of the spring 127 (Fig. 4), namely through the intermediary bell crank lever 99 engaging the extension 105 (Figs. 3 and 5), whereupon the contact plate 98 of the index pawl 91 will interconnect the contacts 78 and 82 immediately after the disengagement has begun, and the electro-magnet 103 (Figs. 6, 9) will receive current through the cable 69 and will pull the shut-off valve 37 instantaneously so far to the right, that the communication of the conduits 32 and 38 is interrupted, while the communication of the annular passage 104 and the conduits 38 and 39 is established.

(4) After the shut-off valve 37 has interconnected the passages 38 and 39, the cock plug 41, rotated by the table 21, which gradually slows down, arrives in a specific position in which the passage 83 is connected with the passage 38, so that the left side of the sleeve 44 is again connected with the discharge conduit 54 by the passages 56, 83, 38, 104, 39, 57, while the cock plug 42 (Figs. 8 and 14), rotated in the same direction, now connects also the right side of sleeve 44 to the discharge conduit 54 through the passages 55, 84, 61, the ball valve 89 (Fig. 6) and the passage 63. Because of the surplus of oil pressure prevailing at the right side of the sleeve 44 and being controlled by the spring loaded ball valve 89, sleeve 44 will remain, axially unmoveable, in its position, whereupon the table 21 is—by turning around the sleeve 44—ultimately locked automatically and will remain in its extreme left position.

After the table 21 has been arrested at the end of its above described travel to the left and as the piston 101 has reached meanwhile its extreme right position (Fig. 5a), the time relay plunger by moving to the left will open the passage 124, so that pressure oil can pass from the conduit 64' through the passages 113, 124, 116 and 121 to the front side of the motor 100 operating the index plate 90.

While the piston 101 operating the index pawl 91 is in its extreme right position (Fig. 5a), and since the rear side H of the piston 100 operating the index plate 90 is in communication with the collecting tank 126 through the conduit 123, annular space 117 and passage 125, the rack 93 is displaced to the left and through pinion 94, pawl 95 and ratchet wheel 96, whereby the workpiece spindle 92 and the index plate 90 are revolved.

As the time-relay plunger 106, 106' continues its movement to the left the annular space 111 establishes communication between the conduit 115 and the conduit 109 soon after the passage 120 has been opened (Fig. 5a), so that the left side of the piston 101 is connected to the discharge 119; concurrently the adjacent annular space 112 of the time-relay plunger establishes communication between the conduit 114 and passage 120, so that the pressure oil is free to pass to the right side of the piston 101 operating the index pawl 91, whereupon the latter will be pressed against the index plate 90 by the bell crank lever 99 and spring 127 (Fig. 4).

However, since the piston 100 operating the index plate 90 has just received pressure oil, and as the index plate 90 has already been turned around through a small angle, the nose 97 of the pawl 91 will bear against the peripheral edge of the index plate 90. Thus the piston 101 operating the index pawl 91 will be advanced to the right very little, namely not more than permitted by the index pawl bearing against the index plate 90.

(5) While the table 21 is still at rest the index plate 90 continues to turn around under the index pawl 91 through the action of the pressure oil reaching the front side of the piston 100 through the passages 113, 124, 116, 1e1 and V, so that in accordance to the width of the respective notches of the index plate 90 the index pawl 91 will after a while snap into one of said notches under the action of the spring 127 and the oil pressure resting upon the right side of the piston 100. In consequence of the engagement of the index pawl 91 in a notch of the index plate 90 (Fig. 4) the electric circuit in the cable 69 is interrupted at the contact point 78, and following the return of the piston 101 into its extreme left position (Fig. 5), the pressure oil passing through passages 113, 124 will proceed through the annular space 117 and the passages 123 and H to the rear side of the working piston 100, the front side of which is in communication with the overflow passage 119 by the passages V, 121, annular space 116 and passage 122, with the result that the piston 100 operating the index plate 90 is reversed and returns into its initial position.

(6) The indexing operation is finished after the nose 97 of the indexing pawl 91 has engaged the respective notch of the index plate 90.

As the result of the breaking of the electric circuit at the contacts 78, 82 by the engagement of the index pawl 91 in the index plate 90 the shut-off valve 37 loaded by spring S returns into the position, shown in Fig. 9, and establishes the communication of the conduit 32 with the conduit 38, whereupon pressure oil flowing through the passages 32, 36, 38 and the passages 83, 56 of the revolved cock plug 41 will now reach the left side of the sleeve 44 (Fig. 8); the latter, being in an angular position, into which it had been turned by the table abutment 46, and in which the table 21 is blocked, is now shifted to the right.

By this longitudinal displacement of the sleeve 44 the table movement is reversed: While sleeve 44 is in its specific displaced position, the pressure oil passes from the passage 28 (Fig. 6) through the throttle valve 79 and the passages 80, 52, 88, 58 (Fig. 7) to the left side of the piston 50 operating the table 21, concurrently the oil at the right side of the piston 50 escapes into the discharge conduit 54 (Fig. 6) through the passages 87, 59, 48, 60 and in turn the table 21 re-commences to move to the right.

When the table 21 reaches its extreme right position the cock plugs 41, 42 and the sleeve 44 are turned around back into the position shown in Fig. 1 by an abutment 46' provided at the left end of the table, with the result, that the table 21 is reversed while the conduits 64, 64' for the indexing mechanism are in communication with the discharge conduit 54; meanwhile the time-relay plunger 106, 106' (Fig. 5) also returns into its initial extreme right position under the action of the spring 107, so that the whole indexing mechanism is re-set for a fresh cycle of operations.

Various changes and modifications may be conveniently made in the structural details of spline shaft grinding machines of the improved design described with reference to Figs. 1 to 15 of the drawings without departing from the spirit and the salient ideas of this invention.

Instead of a single profiled grinding wheel 24 two or three grinding wheels rotating at high speed may be used to advantage, also tools of other types including rotary milling cutters may be conveniently used for cutting the grooves in the work pieces concerned.

Instead of mounting the indexing mechanism 22 on the reciprocating table 21, as seen in Fig. 1, and providing a stationary tool 24, the tool may be mounted on the reciprocating table, while the work piece and the indexing mechanism are stationarily fixed as seen in Fig. 16 of the drawings: In the latter the indexing mechanism 22' is secured to the machine bed 20' by screw bolts $i, i'$, while the support 24' of the grinding wheel 24'' is fixed at $e, e'$ and carried by the reciprocating table 21'' operated by piston 50'.

In this case the pressure oil conduit 64'' can be made in the form of an ordinary pipe rigidly connecting the indexing mechanism with the control block 40', while in the machine shown in Fig. 1 a telescope or other extensible tube 64' and a flexible cable 69 following the reciprocating movements of the indexing mechanism must be provided.

The various other mechanisms shown in Fig. 16 for distributing the pressure oil to the working piston 50' and the indexing mechanism 22' structurally conform to those described with reference to Figs. 1 to 15 and designated by the same reference numbers 27 to 103.

What we claim is:

1. In a machine tool having a tool and a table adapted to be reciprocated relatively to each other in rectilinear paths of movement, the combination with a headstock spindle for carrying a work piece to be revolvingly indexed, of a hydraulic indexing mechanism attached to said headstock spindle for indexing the work piece and positively locking it in its indexed position, another hydraulic mechanism for reciprocating said table, and controlling means cooperatively interengaging said hydraulic mechanisms for locking the table until the work piece has been locked in its indexed position, said reciprocating mechanism comprising a piston attached to said table and means for alternately distributing oil under pressure to opposite sides of said piston, said controlling means comprising a shut-off valve and an electromagnet operating the latter and cooperatively associating the said indexing mechanism and distributing means, the latter comprising a rotary spline shaft adapted to be revolvingly reciprocated by the table, a pair of recessed cock plugs coaxially fixed on said spline shaft, and a recessed sleeve slidably fixed on said spline shaft between said cock plugs for cooperation with the latter.

2. In a machine tool having a tool and a table adapted to be reciprocated relatively to each other in rectilinear paths of movement, the combination with a headstock spindle for carrying a work piece to be revolvingly indexed, of a hydraulic indexing mechanism attached to said headstock spindle for indexing the work piece and positively locking it in its indexed position, another hydraulic mechanism for reciprocating said table, and controlling means cooperatively interengaging said hydraulic mechanisms for locking the table until the work piece has been locked in its indexed position, said indexing mechanism comprising a circumferentially notched index plate, an index pawl adapted to engage the notches of said plate, a ratchet mechanism engaging the said headstock spindle and in turn revolving said index plate, a piston for actuating said ratchet mechanism, another piston for actuating said index pawl, and a time-relay for controlling the admission of oil under pressure to said piston.

3. In a machine tool having a tool and a table adapted to be reciprocated relatively to each other in rectilinear paths of movement, the combination with a headstock spindle for carrying a work piece to be revolvingly indexed, of a hydraulic indexing mechanism attached to said headstock spindle for indexing the work piece and positively locking it in its indexed position, another hydraulic mechanism for reciprocating said table, and controlling means cooperatively interengaging said hydraulic mechanisms for locking the table until the work piece has been locked in its indexed position, said indexing mechanism comprising a circumferentially notched index plate, an index pawl adapted to engage the notches of said plate, a ratchet mechanism engaging the said headstock spindle and in turn revolving said index plate, a piston for actuating said ratchet mechanism, another piston for actuating said index pawl, and a time-relay for controlling the admission of oil under pressure to said pistons, said index pawl comprising a double armed lever loaded by a spring, a circuit making and breaking plate for cooperation with said controlling means, and a bell crank lever interengaging said lever and the piston actuating the index pawl.

4. In a machine tool having a tool and a table adapted to be reciprocated relatively to each other in rectilinear paths of movement, the combination with a headstock spindle for carrying a work piece to be revolvingly indexed, of a hydraulic indexing mechanism attached to said headstock spindle for indexing the work piece and positively locking it in its indexed position, another hydraulic mechanism for reciprocating said table, and controlling means cooperatively interengaging said hydraulic mechanisms for locking the table until the work piece has been locked in its indexed position, said indexing mechanism comprising a circumferentially notched index plate, an index pawl adapted to engage the notches of said plate, a ratchet mechanism engaging the said headstock spindle and in turn revolving said index plate, a piston for actuating said ratchet mechanism, another piston for actuating said index pawl, and a time-relay for controlling the admission of oil under pressure to said pistons, said time-relay comprising a spring loaded plunger having annular recesses and being reciprocatably mounted in the indexing mechanism.

RUDOLF WESTENBERGER.
WALTER HAUFFE.
WILLY GEORGI.